UNITED STATES PATENT OFFICE.

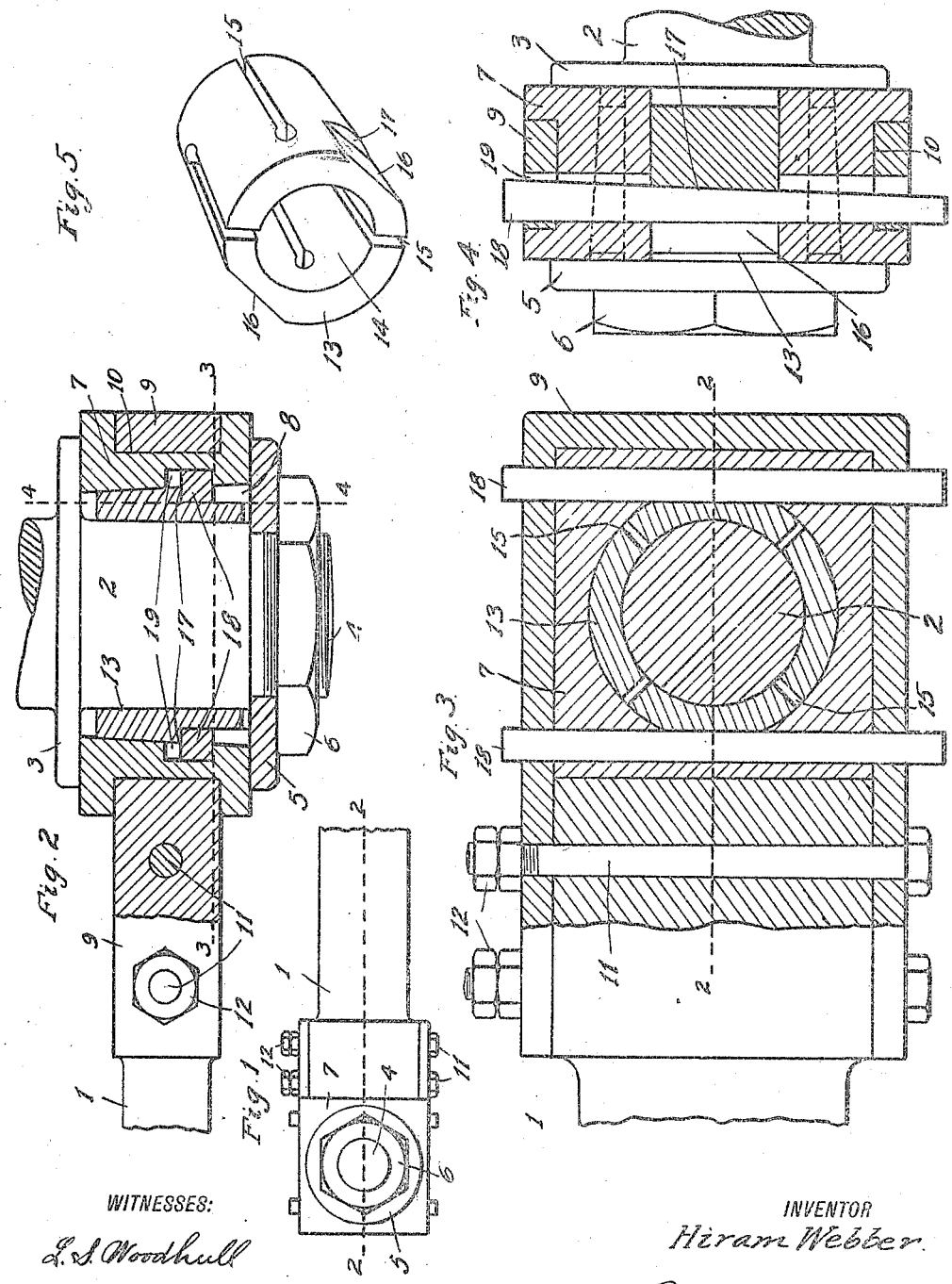

HIRAM WEBBER, OF GRAND RAPIDS, MICHIGAN, ASSIGNOR OF ONE-HALF TO WILLIAM J. WEBBER, OF DETROIT, MICHIGAN.

ADJUSTABLE JOURNAL-BEARING.

1,233,426.     Specification of Letters Patent.     Patented July 17, 1917.

Application filed December 4, 1916. Serial No. 134,794.

*To all whom it may concern:*

Be it known that I, HIRAM WEBBER, a citizen of the United States, residing at Grand Rapids, in the county of Kent and State of Michigan, have invented a new and useful Adjustable Journal-Bearing, of which the following is a specification.

This invention relates to journal bearings especially adapted for use in locomotive connecting rods, and it consists in the novel features of construction as hereinafter set forth and claimed.

The object of the invention is to provide a simple and improved form of journal bearing for the driving rods connecting the crank pins of locomotive drive wheels, in which the construction is such that the bearing is rendered adjustable to compensate for wear and maintain a close working connection with the journal, and also to enable the ready removal of the bearing, when damaged or worn, for the purpose of repair or replacement.

A preferred structural embodiment of the essential features of the present invention by which the above object is effectively attained, is illustrated in the accompanying drawings, and in which, Figure 1 is a side elevation of the end portion of a connecting rod equipped with a bearing constructed in accordance with my invention.

Fig. 2 is an enlarged central horizontal section through the rod and bearing on dotted line 2—2 of Fig. 1.

Fig. 3 is a vertical sectional view on dotted line 3—3 of Fig. 2.

Fig. 4 is a transverse section on dotted line 4—4 of Fig. 2.

Fig. 5 is a perspective view of a tapered longitudinally slotted bearing bushing for the journal.

Referring to the parts of the device by the characters of reference marked on the drawings, 1 designates a connecting rod commonly employed for coupling the crank pins of the driving wheels of a locomotive and 2 indicates a crank pin forming the journal for the connecting rod bearing. This journal is usually provided with an enlarged collar or flange 3 and with a reduced screw-threaded stem 4 forming a shoulder against which a washer 5 receiving said stem is secured by a binding nut 6 thereon. Said flange and washer, which engage respectively with opposite sides of a bearing block 7 for the connecting rod, serve to limit the lateral movement of said rod upon the crank pin or journal, as shown in Fig. 2.

The bearing block 7 which is rectangular in form is provided with a tapered aperture 8, extending transversely and centrally therethrough, of greater diameter than that of the journal 2 about which it is spaced concentrically, and said block is secured to the end of the connecting rod 1 in the usual way by means of an embracing strap or yoke 9, the body of which is received in a recess 10 formed in the engaged edges of said block, and the free ends of the yoke are secured to opposite edges of said connecting rod by bolts 11 having binding nuts 12. (See Figs. 2 and 3.)

The bearing for the journal consists of a bushing or sleeve 13 preferably of brass, bronze or other suitable anti-friction metal, which is tapered longitudinally exteriorly to coincide with and fit into the tapered aperture 8 of the bearing block 7, and is provided with an axial bore 14 through which said journal extends rotatably embraced thereby. (See Figs. 2 and 5).

The length of the sleeve 13 with respect to the width of the bearing block 7 is such as to enable it to be contained therein free from engagement with the washer 5, and to provide for clearance space between the reduced end of the sleeve and the flange 3 of the journal to permit of axial movement of said sleeve toward the constricted end of the tapered aperture of said block, as shown in Figs. 2 and 4.

To render the wall of the sleeve resilient and contractible diametrically, the end portions are divided by a series of circumferentially spaced radial slots 15 relatively staggered to extend longitudinally in opposite directions from the ends of said sleeve well into the body thereof so that the divided segments of the sleeve remain connected by the portions of the wall adjacent the inner ends of said slots (see Fig. 5). Formed in the wall of the sleeve upon diametrically opposite sides of the enlarged end thereof are peripheral notches having parallel surfaces 16 extending in the plane of a chord to the arc of the sleeve and forming lateral shoulders 17 in the body of said sleeve for engagement with driving keys or wedges 18 by means of which said sleeve is forced into the tapered aperture of the bearing block. The wedges which are rectangular in cross section and longitudinally tapered, or inclined upon one side only, are extended through parallel ways 19 formed through the binding yoke and bearing block transversely of and upon opposite sides of the journal in registering alinement with the peripheral notches of the bearing sleeve, said wedges being positioned therein to present their inclined sides respectively to the shoulders 17 of the sleeve, with their parallel sides embraced between the walls of the ways 19 and the respective parallel surfaces 16 of said notches, whereby, through the engagement with which, said sleeve is held against rotation within the bearing block and may be forced axially into the tapered aperture thereof by the pressure exerted upon said shoulders through engagement with the inclined surfaces of said wedges when forced or driven longitudinally into said ways, as clearly shown in Figs. 3 and 4.

It will now be observed from the above description of the construction and arrangement of parts, that the longitudinally slotted and tapered sleeve constituting the bearing for the journal, and which is subjected to wear by frictional contact of the wall of the bore therewith, is rendered contractible diametrically through the angular or wedging engagement of the tapered periphery thereof with the embracing wall of the tapered aperture of the bearing block under the axial pressure exerted thereon by the driving wedges; that the contraction of the sleeve may thus be effected from time to time to compensate for wear and establish and maintain a close working relation with the journal. It will also be noted that by the provision of the slots through the wall of the sleeve channels are formed for the passage and distribution of lubricant longitudinally of the journal to insure proper lubrication throughout the bearing surfaces, and that owing to the resilient or yielding character of the wall of the sleeve it will not tend to become wedged or tightly set within the bearing block and may therefore be readily removed for repair or replacement upon the withdrawal of the engaging wedges.

It is obvious that changes may be made in the structural details without departing from the essential features of the invention which is herewith presented as including all such changes and modification as properly come within the scope and meaning of the following claims.

I claim:

1. In a bearing of the character described, the combination with a rotatable journal, of a bearing block having a tapered aperture surrounding said journal, a longitudinally and exteriorly tapered sleeve embracing said journal and seated in the tapered aperture of said bearing block, said sleeve having the wall thereof slotted longitudinally to render it contractible diametrically, and driving wedges inserted between the sleeve and bearing block and serving to force said sleeve axially into said tapered aperture.

2. In a bearing of the character described, the combination with a rotatable journal, of a bearing block having a tapered aperture surrounding said journal, a longitudinally and exteriorly tapered sleeve embracing said journal and seated in the tapered aperture of said bearing block, said sleeve having the wall thereof slotted longitudinally and provided upon diametrically opposite sides with peripheral shoulders, and driving wedges extending through said bearing block in engagement with said shoulders and serving to force said sleeve axially into said tapered aperture.

3. In a bearing of the character described, the combination with a rotatable journal, of a bearing block having a tapered aperture surrounding said journal, said block having parallel key-ways extending transversely therethrough and through the wall of said aperture upon opposite sides thereof, a longitudinally tapered cylindrical sleeve embracing said journal and embraced by the wall of said tapered aperture, said sleeve having longitudinal slots extending through the wall thereof from opposite ends and provided upon opposite sides with peripheral notches in registering alinement with the key-ways of said bearing block, and tapered keys seated in said ways and engaging said notches to retain said sleeve against rotation and serving to exert pressure thereon axially of said tapered aperture.

In testimony whereof I sign this specification.

HIRAM WEBBER.